(12) United States Patent
Adeeb et al.

(10) Patent No.: US 10,318,294 B2
(45) Date of Patent: Jun. 11, 2019

(54) OPERATION OF A MULTI-SLICE PROCESSOR IMPLEMENTING DEPENDENCY ACCUMULATION INSTRUCTION SEQUENCING

(71) Applicant: International Business Machines Corporation, Armonk, NY (US)

(72) Inventors: Khandker N. Adeeb, Austin, TX (US); Joshua W. Bowman, Austin, TX (US); Jeffrey C. Brownscheidle, Seattle, WA (US); Brandon R. Goddard, Friendswood, TX (US); Dung Q. Nguyen, Austin, TX (US); Tu-An T. Nguyen, Austin, TX (US); Brian D. Victor, Austin, TX (US); Brendan M. Wong, Beaumont, TX (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 15/186,744

(22) Filed: Jun. 20, 2016

(65) Prior Publication Data

US 2017/0364358 A1 Dec. 21, 2017

(51) Int. Cl.
*G06F 9/30* (2018.01)

(52) U.S. Cl.
CPC ...... *G06F 9/30054* (2013.01); *G06F 9/30072* (2013.01)

(58) Field of Classification Search
CPC .......................... G06F 9/30054; G06F 9/30072
See application file for complete search history.

(56) References Cited

U.S. PATENT DOCUMENTS

| 5,911,083 A * | 6/1999 | Kuslak ...................... G06F 5/06 712/41 |
| 6,098,166 A * | 8/2000 | Leibholz ............... G06F 9/3824 712/215 |
| 6,697,932 B1 * | 2/2004 | Yoaz ..................... G06F 9/3824 712/216 |

(Continued)

FOREIGN PATENT DOCUMENTS

EP       1141821 A4    6/2005

OTHER PUBLICATIONS

Anonymous, "Reduced Register Out of Order Age Priority Processor Instruction Issue Queue", IP.com (online) Prior Art Database Technical Disclosure, Oct. 2013, 5 pages, IPCOM000231835D, URL: http://ip.com/IPCOM/000231835.

(Continued)

*Primary Examiner* — Aimee Li
*Assistant Examiner* — Kasim Alli
(74) *Attorney, Agent, or Firm* — Nathan M. Rau

(57) ABSTRACT

Operation of a multi-slice processor that includes a plurality of execution slices. Operation of such a multi-slice processor includes: receiving a first instruction indicating a first target register; receiving a second instruction indicating the first target register as a source operand; responsive to the second instruction indicating the first target register as a source operand, updating a dependent count corresponding to the first instruction; and issuing, in dependence upon the dependent count for the first instruction being greater than a dependent count for another instruction, the first instruction to an execution slice of the plurality of execution slices.

17 Claims, 8 Drawing Sheets

(56) References Cited

U.S. PATENT DOCUMENTS

| | | |
|---|---|---|
| 6,760,816 B1* | 7/2004 | Ju .................. G06F 9/30043 711/133 |
| 7,269,713 B2 | 9/2007 | Anderson et al. |
| 7,664,936 B2 | 2/2010 | Jensen et al. |
| 7,984,270 B2 | 7/2011 | Luick |
| 2015/0106595 A1 | 4/2015 | Khot et al. |

OTHER PUBLICATIONS

Arandi et al., "DDM-VMc: The Data-Driven Multithreading Virtual Machine for the Cell Processor", Proceedings of the 6th International Conference on High Performance and Embedded Architectures and Compilers, (HiPEAC 2011), Jan. 2011, pp. 25-34, ACM New York, NY, USA.

* cited by examiner

OPERATION OF A MULTI-SLICE PROCESSOR IMPLEMENTING DEPENDENCY ACCUMULATION INSTRUCTION SEQUENCING

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Such a multi-slice processor may further include an instruction sequencing unit implementing dependency accumulation instruction sequencing. Operation of such a multi-slice processor includes: receiving a first instruction indicating a first target register; receiving a second instruction indicating the first target register as a source operand; responsive to the second instruction indicating the first target register as a source operand, updating a dependent count corresponding to the first instruction; and issuing, in dependence upon the dependent count for the first instruction being greater than a dependent count for another instruction, the first instruction to an execution slice of the plurality of execution slices in place of other ready instructions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
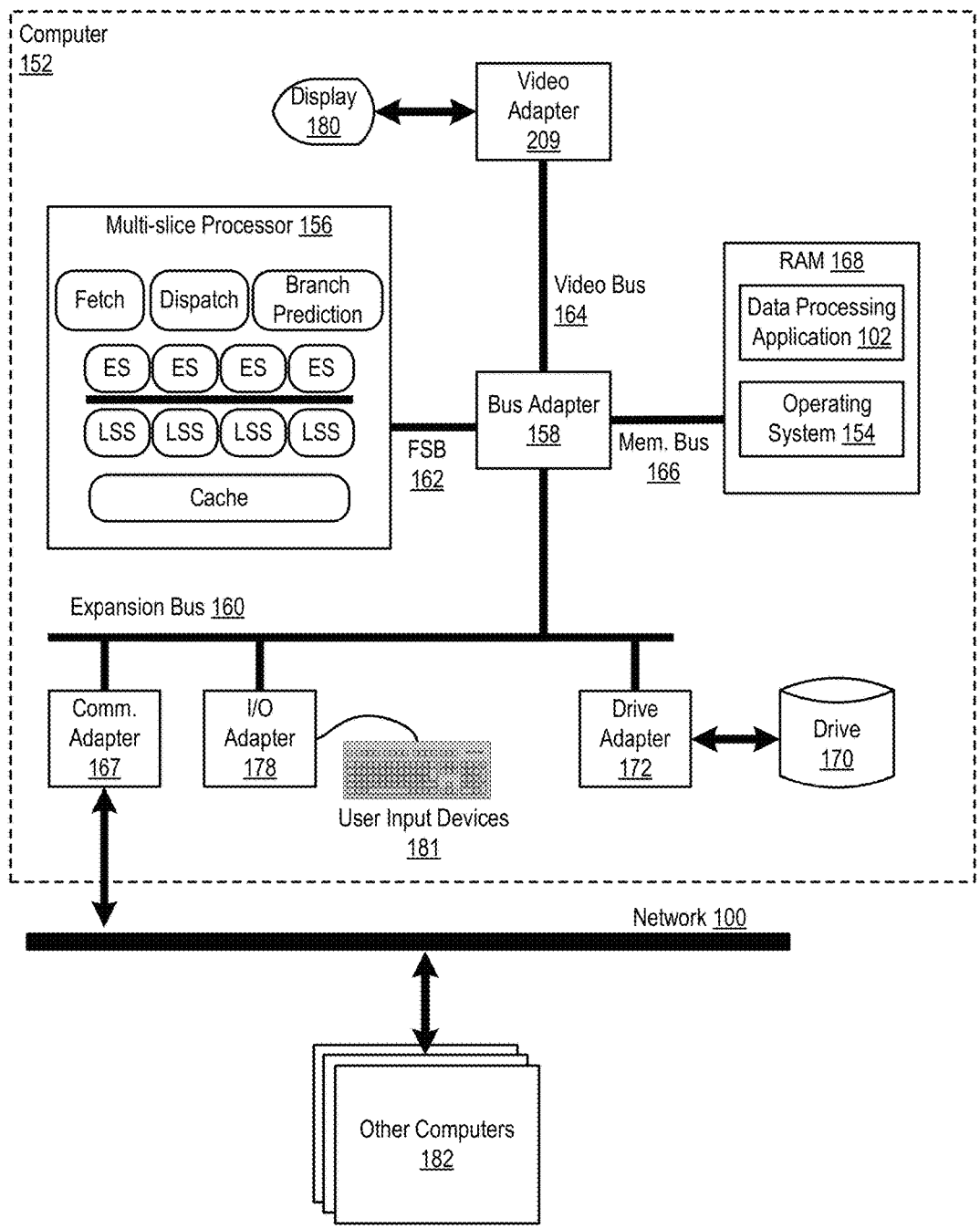
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
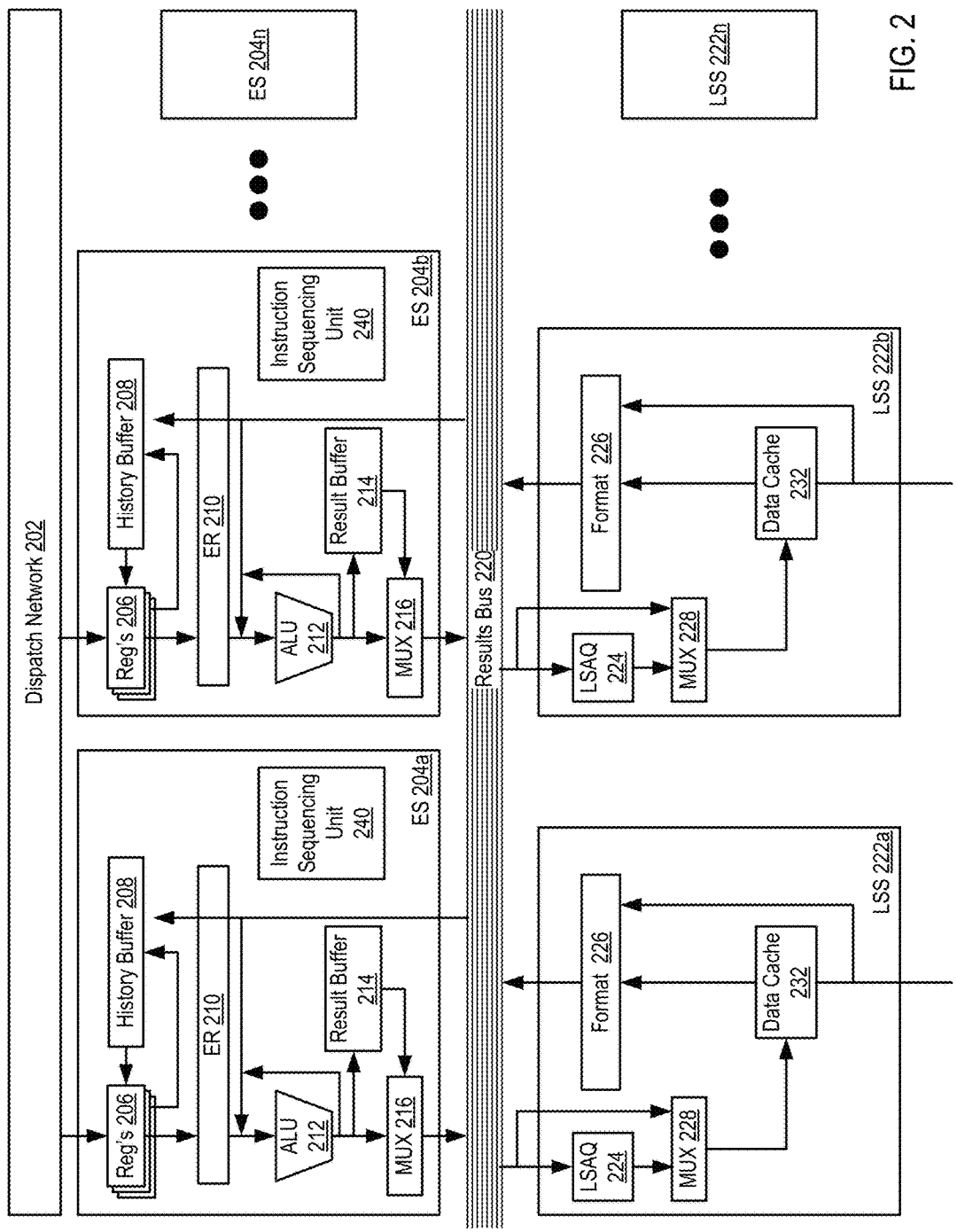
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same logical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The issue queue may also include a single entry per single instruction, where the single entry handles all operands for the single instruction. The execution reservation station may issue a complete instruction at a time, including the operands for the instruction when the operands for the instruction are ready, for execution—depending on whether the instruction is a load/store instruction or an arithmetic instruction—by the arithmetic logic unit (ALU) (212) or to a load/store slice (222a, 222b, 222c) via the results bus (220). For example, the execution reservation station may determine that data for all operands is available, and in response, the execution reservation station may issue the instruction to the arithmetic logic unit (212).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then be issued to any other slice for performance benefits. Further, an instruction may also be executed by a different execution slice than the execution slice from which the instruction is issued. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a load/store access queue (LSAQ) (224), a multiplexer (MUX) (228), a data cache (232), and formatting logic (226), among other components described below with regard to FIG. 3. The load/store access queue (224) receives load and store operations to be carried out by the load/store slice (222). The formatting logic (226) formats data into a form that may be returned on the results bus (220) to an execution slice as a result of a load or store instruction. The multiplexer (228) may select an input in dependence upon data from the load/store access queue (224) or on receiving data from the results bus.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including branch mispredictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5. In other words, in this example, instruction B is moved back into the entry of the general purpose register for logical register 5 instead of instruction A because instruction B was not flushed. However, in this example, if instruction C and instruction B been flushed, then instruction A would have been selected to be moved back to the history buffer.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one or more logical registers as its source, may also target another one or more logical registers for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted within individual execution slices, in some cases, the instruction sequencing unit may be implemented independently of the execution slices or implemented within dispatch network (202). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions, where a program order may be determined by an instruction tag (ITAG). Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
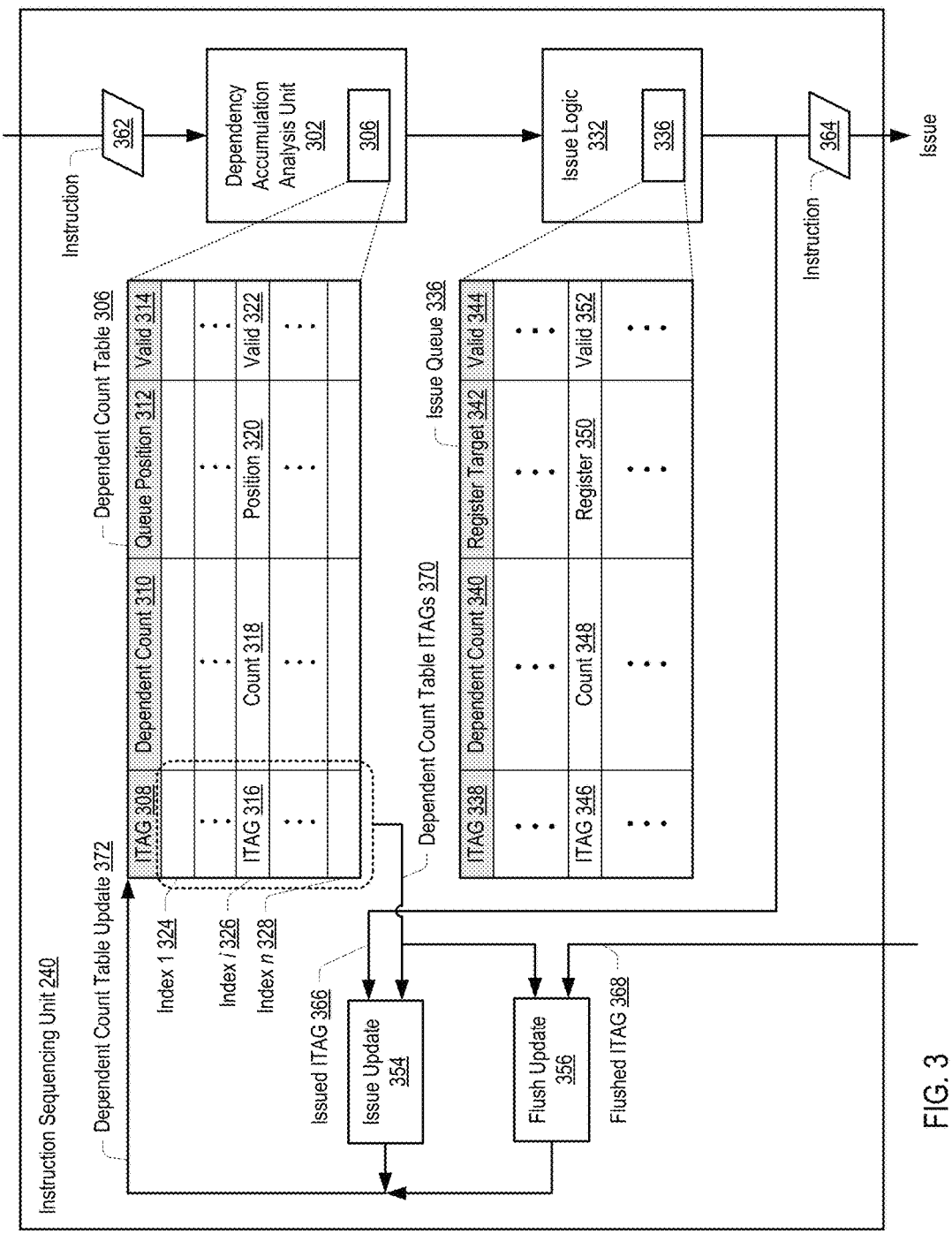
FIG. 3 sets forth a block diagram of an instruction sequencing unit of a multi-slice processor, where the instruction sequencing unit implements dependency accumulation instruction sequencing according to different embodiments.

For further explanation, FIG. 3 sets forth a block diagram depicting an instruction sequencing unit (240) configured to include logic for implementing dependency accumulation instruction sequencing. Dependency accumulation instruction sequencing allows for issuance of instructions based at least upon a combination of relative instruction age and a number of instructions that are dependent upon a queued, ready instruction. For example, if multiple instructions have been received and queued into an issue queue, where each queued instruction has a respective number of dependent instructions awaiting execution of the queued instruction, then—from among multiple ready instructions—issuance of a queued instruction with the greatest number of dependent instructions may allow for instructions sequencing with fewer dependency delays. In some cases, instruction age could be used to select between instructions with an equal number of dependent instructions—with priority given to older instructions. Further, the selection of which queued, ready instruction to issue may alternate between dependence on instruction age and between dependence on a number of dependent instructions that depend on a particular instruction.

The instruction sequencing unit (240), among other components, includes a dependency accumulation analysis unit (302) and issue logic (332). The dependency accumulation analysis unit (302) may maintain a dependent count table (306) for tracking, for a particular instruction, numbers of dependent instructions. The issue logic (332) may maintain an issue queue (336) for storing queued instructions that have been received but have not yet been issued. In this example, a received instruction is instruction (362), and an issued instruction is instruction (364).

The issue queue (336) may include an entry for each instruction received from a dispatch network (202) that has not yet been issued, where a particular entry of the issue queue (304) may include fields for an ITAG (338), dependent count (340), register target (342), and valid (344).

The ITAG (338) field may indicate an ITAG for an instruction entry that has been queued in the issue queue (336). In this example, an entry for a queued instruction includes ITAG (346).

The dependent count (340) field for an entry may indicate a quantity of instructions that are dependent on a result from the instruction for the entry. In this example, an entry for a queued instruction includes count (348), which indicates a quantity of instructions dependent upon a result of the queued instruction.

The register target (342) field for an entry may indicate a target register for the instruction of the entry. For example, register (350) may correspond to one of the registers from the general purpose registers (206) of an execution slice. The instruction sequencing unit (240) may determine instruction dependencies at least in part on whether a subsequent instruction includes—as a source operand—a target register of a previous instruction. In this example, the subsequent instruction would be delayed from issuing until at least the previous instruction generated a result to be used by the subsequent instruction for each of its source operands—where an instruction that is dependent on more than one source operand result may be dependent on more than one instruction.

The valid (344) field may indicate whether or not an instruction entry is valid or not, where, for example, valid may be indicated by a nonzero value and invalid may be indicated by a zero value. In this example, the valid (352) value may indicate validity of the instruction for the entry.

The dependent count table (306) may include an entry for one or more instructions received from the dispatch network (202), where a particular entry of the dependent count table (306) may include fields for an ITAG (308), dependent count (310), queue position (312), and valid (314).

The ITAG (308) field may indicate an ITAG for an instruction entry that has been queued in the issue queue (336). In this example, an entry for a queued instruction includes ITAG (316).

The dependent count (310) field, similar to the dependent count (340) field of the issue queue (336), for an entry may indicate a quantity of instructions that are dependent on a result from the instruction for the entry. In this example, an entry for a particular instruction includes count (318), which indicates a quantity of instructions dependent upon a result of the particular instruction.

The queue position (312) field, corresponding to a particular entry of the dependent count table (306), may store an index value that may be used to index into an entry of the issue queue (336), where the entry of the issue queue (336) that is indexed corresponds to a particular instruction. For example, if the entry at index i (326) has a position (320) value that is equal to q, then entry q of the issue queue (336) would store an instruction with an ITAG (338) value that is equal to the ITAG (316) value for the entry i (326) in the dependent count table (306). Generally, the dependent count table (306) may include any number of entries, and in this example, there are n entries, from index 1 (324)-index n (328).

The valid (314) field may indicate whether or not an instruction entry is valid or not, where, for example, valid may be indicated by a nonzero value and invalid may be indicated by a zero value. In this example, the valid (322) value may indicate validity of the instruction for the entry.

In addition to maintaining the dependent count table (306) and issue queue (336) in response to incoming instructions, the instruction sequencing unit (240) may also update the dependent count table (306) and the issue queue (336) in response to instructions being issued or in response to instructions being flushed. Specifically, the issue update (354) logic may receive information for issued instructions and update the dependent count table (306) and issue queue (336) accordingly. Similarly, the flush update (356) logic may receive ITAG information for flushed instructions and update the dependent count table (306) and issue queue (336) accordingly. Further, the updates to dependent count table (306) may be propagated along the dependent count table update (372) line.

The issue update (354) logic may, in response to receiving an issued instruction ITAG, may compare the issued instruction ITAG to each ITAG value in the dependent count table (306) to identify an entry to update—where the update may change the valid (314) field value from indicating valid to indicating invalid. In this example, the issued instruction ITAG is depicted as issued ITAG (366), and the ITAG values in the dependent count table (306) are depicted as dependent count table ITAGs (370).

The flush update (356) logic may, in response to receiving an flushed instruction ITAG, may compare the flushed instruction ITAG to each ITAG value in the dependent count table (306) to identify an entry to update—where the update may change the valid (314) field value from indicating valid to indicating invalid. In this example, the flushed instruction ITAG is depicted as flushed ITAG (368), and the ITAG values in the dependent count table (306) are depicted as dependent count table ITAGs (370)—where each ITAG of the dependent count table ITAGs (370) may be compared to the flushed ITAG (368) to identify an entry in the dependent count table (306) for the flushed instruction. In addition, instructions that have had a dependency count value incremented in response to the flushed instruction may also be updated in response to the flushed instruction. For example, each valid instruction that had a dependency count value incremented in response to being dependent on the flushed instruction may either have a dependency count value set to zero or decremented by an amount equal to an amount by which the dependency count value was incremented.

Figure 4:
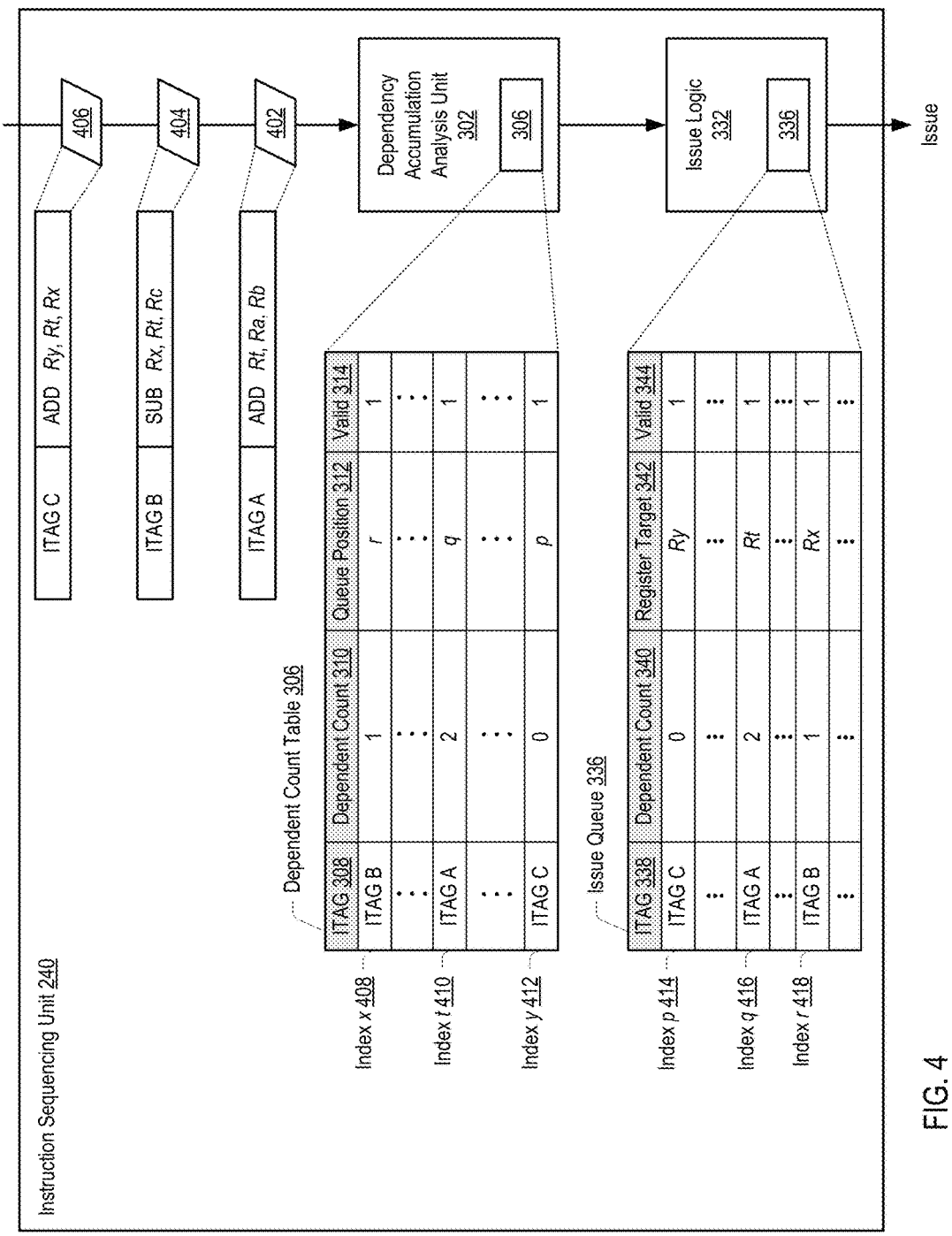
FIG. 4 sets forth a block diagram of a dependent count table and an issue queue of an instruction sequencing unit of a multi-slice processor, where the instruction sequencing unit implements dependency accumulation instruction sequencing according to different embodiments.

For further explanation, FIG. 4 sets forth a block diagram depicting updates to the dependent count table (306) and the issue queue (336) according to an implementation of dependency accumulation instruction sequencing. In this example, the updates to the dependent count table (306) and the issue queue (336) are in response to receiving instructions (402, 404, 406). Further, in this example, instruction (402) is received before instructions (404) and (406), and instruction (404) is received before instruction (406).

Instruction (402), in this example, has an ITAG value of "ITAG A" and corresponds to an addition instruction ("ADD Rt, Ra, Rb") indicating that the sum of the contents in register Ra and the contents in register Rb are stored in register Rt. In this example, Rt is the target register, and Ra and Rb are source registers or source operands; and instruction (402) is not dependent on other instructions.

In response to receiving instruction (402), the dependency accumulation analysis unit (302) may update the dependent count table (306). In this example, the update to the dependent count table (306) may be carried out by indexing the dependent count table (306) according to the target register, in this case the target register is Rt, to identify an entry at index t (410). The update further includes storing "ITAG A" in the ITAG (308) field, storing "0" in the dependent count (310) field, storing "q" in the queue position (312) field, and storing "1" in the valid (314) field. In this example, the dependent count (310) value is initially zero (0) since no instructions dependent on instruction (402) have been received yet, the value "0" is stored in the dependent count (310) field. As instructions dependent upon a result generated by instruction (402) are identified, the dependent count (310) field is incremented for each dependent instruction. While a "1" is stored in the valid (314) field to indicate validity, in other examples, other values may be defined to indicate validity. Further, the dependent count (340) values in the issue queue (336) are updated according to the updated dependent count (310) values in the dependent count table (310).

In this example, the value "q" is stored in queue position (312) because the issue logic (332) stores instruction (402) within issue queue (336) entry corresponding to index q (416) further, the queue position (312) field may be set by the issue logic (332) after the issue logic (332) has stored instruction (402) within an entry of the issue queue (336), where the issue logic (332) may index into the dependent count table (306) using the register target (342) value as an index into the dependent count table (306).

Further in response to receiving instruction (402), the issue logic (332) may update the issue queue (336). In this example, the update to the issue queue (336) may be carried out by the issue logic (332) identifying an available entry within the issue queue (336)—the entry corresponding to index q (416). The update further includes storing "ITAG A" in the ITAG (338) field, storing "0" in the dependent count (340), storing "Rt" in the register target (342) field, and storing "1" in the valid (344) field. Similar to the update to the dependent count table (302), after receiving instruction (402), and before receiving other instructions, the dependent count is initially zero (0). Further, in this example, register Rt is the target register, and Rt may be used to index in to the dependent count table (301) for finding the entry corresponding to the entry for the same instruction, instruction (402) identified by "ITAG A."

Instruction (404), in this example, has an ITAG value of "ITAG B" and corresponds to a subtraction instruction ("SUB Rx, Rt, Rc") indicating that the difference of the contents in register Rt and the contents in register Rc are stored in register Rx. In this example, Rx is the target register, and Rt and Rc are source registers. Further, because instruction (404) has register Rt as a source register, and instruction (404) is subsequent to instruction (402), instruction (404) is dependent upon a result generated by instruction (402), which has register Rt as a target register.

In response to receiving instruction (404), the dependency accumulation analysis unit (302) may update the dependent count table (306). In this example, the update to the dependent count table (306) may be carried out by indexing the dependent count table (306) according to the target register, in this case the target register is Rx, to identify an entry at index x (408). The update further includes storing "ITAG B" in the ITAG (308) field, storing "0" in the dependent count (310) field, storing "r" in the queue position (312) field, and storing "1" in the valid (314) field. In this example, the dependent count (310) value is initially zero (0), and since no instructions dependent on instruction (404) have been received yet, the value "0" is stored in the dependent count (310) field. As instructions dependent upon a result generated by instruction (404) are identified, the dependent count (310) field is incremented.

The update in response to receiving instruction (404) may further include identifying instruction (402) as an instruction upon which instruction (404) is dependent. Identifying instruction (402) may be carried out by the dependency accumulation analysis unit (302) indexing the dependent count table (306) using indexes for the source registers of instruction (404), which in this example are registers Rt and Rc. Indexing into dependent count table (306) using register Rt leads to the instruction "ITAG A" at index t (410), which is valid—therefore instruction "ITAG B" at entry index x (408) is determined to be dependent upon instruction "ITAG A" at entry index t (410), and the dependent count (310) value for the entry at index t (410) is incremented to one (1). Similarly, dependent count table (306) may be indexed according to each other source operand, which in this example is register Rc, which does not correspond to a valid entry in dependent count table (306). Further, the dependent count (340) values in the issue queue (336) may be updated according to the updated dependent count (310) values in the dependent count table (310), as described below. In another example, the issue queue (336) may be updated in response to an indication, or command, to increase a dependent count value for a specified entry index by a specified quantity.

In this example, the value "r" is stored in queue position (312) because the issue logic (332) stores instruction (404) within issue queue (336) entry corresponding to index r (418)—further, the queue position (312) field may be set by the issue logic (332) after the issue logic (332) has stored instruction (404) within an entry of the issue queue (336), where the issue logic (332) may index into the dependent count table (306) using the register target (342) value as an index into the dependent count table (306).

Further in response to receiving instruction (404), the issue logic (332) may update the issue queue (336). In this example, the update to the issue queue (336) may be carried out by the issue logic (332) identifying an available entry within the issue queue (336)—the entry corresponding to index r (418). The update further includes storing "ITAG B" in the ITAG (338) field, storing "0" in the dependent count (340), storing "Rx" in the register target (342) field, and storing "1" in the valid (344) field. Similar to the update to the dependent count table (302), after receiving instruction (402), and before receiving other instructions, the dependent count is initially zero (0). Further, register Rx is the target register, and Rx is used to index in to the dependent count (306) table for finding the entry corresponding to the entry for the same instruction, instruction (404) identified by "ITAG B."

Instruction (406), in this example, has an ITAG value of "ITAG C" and corresponds to an addition instruction ("ADD Ry, Rt, Rx") indicating that the sum of the contents in register Rt and the contents in register Rx are stored in register Ry. In this example, Ry is the target register, and Rt and Rx are source registers. Further, because instruction (406) has register Ry as a source register, and instruction (406) is subsequent to instructions (402) and (404), instruction (406) is dependent upon results generated by instructions (402) and (404), which have, respectively, registers Rt and Rx as target registers.

In response to receiving instruction (406), the dependency accumulation analysis unit (302) may update the dependent count table (306). In this example, the update to the dependent count table (306) may be carried out by indexing the dependent count table (306) according to the target register, in this case the target register is Ry, to identify an entry at index y (412). The update further includes storing "ITAG C" in the ITAG (308) field, storing "0" in the dependent count (310) field, storing "p" in the queue position (312) field, and storing "1" in the valid (314) field. In this example, the dependent count (310) value is initially zero (0), and since no instructions dependent on instruction (406) have been received yet, the value "0" is stored in the dependent count (310) field. As instructions dependent upon a result generated by instruction (406) are identified, the dependent count (310) field is incremented.

The update in response to receiving instruction (406) may further include identifying instructions upon which instruction (406) is dependent. Identifying the instructions upon which the received instruction (406) is dependent may be carried out by the dependency accumulation analysis unit (302) indexing the dependent count table (306) using indexes for the source registers of instruction (406), which in this example are registers Rt and Rx. Indexing into dependent count table (306) using register Rt leads to the instruction "ITAG A" at index t (410), which is valid—therefore instruction "ITAG C" at entry index x (408) is determined to be dependent upon instruction "ITAG A" at entry index t (410), and the dependent count (310) value for the entry at index t (410) is incremented to two (2). Similarly, dependent count table (306) may be indexed according to each other source operand, which in this example is register Rx, which leads to the instruction "ITAGB" at index x (408), which is valid—therefore instruction "ITAG B" at entry index x (408) is determined to be dependent upon instruction "ITAG A" at entry index t (410), and the dependent count (310) value for the entry at index t (410) is incremented to one (1). Further, the dependent count (340) values in the issue queue (336) are updated according to the updated dependent count (310) values in the dependent count table (310).

In this example, the value "p" is stored in queue position (312) because the issue logic (332) stores instruction (406) within issue queue (336) entry corresponding to index p (414)—further, the queue position (312) field may be set by the issue logic (332) after the issue logic (332) has stored instruction (406) within an entry of the issue queue (336), where the issue logic (332) may index into the dependent count table (306) using the register target (342) value as an index into the dependent count table (306).

Further in response to receiving instruction (406), the issue logic (332) may update the issue queue (336). In this example, the update to the issue queue (336) may be carried out by the issue logic (332) identifying an available entry within the issue queue (336)—the entry corresponding to index p (414). The update further includes storing "ITAG C" in the ITAG (338) field, storing "0" in the dependent count (340), storing "Ry" in the register target (342) field, and storing "1" in the valid (344) field. Similar to the update to the dependent count table (302), after receiving instruction (402), and before receiving other instructions, the dependent count is initially zero (0). Further, register Ry is the target register, and Ry is used to index in to the dependent count (306) table for finding the entry corresponding to the entry for the same instruction, instruction (404) identified by "ITAG C."

In this way, as each instruction is received, the dependent count table (306) and the issue queue (336) may be updated to reflect a current number of instructions upon which a particular instruction may have dependencies—where the issue logic (332) may determine an instruction to select for issuance at least in dependence upon dependent count (310) value for each of a plurality of instructions that may be ready to issue.

Figure 5:
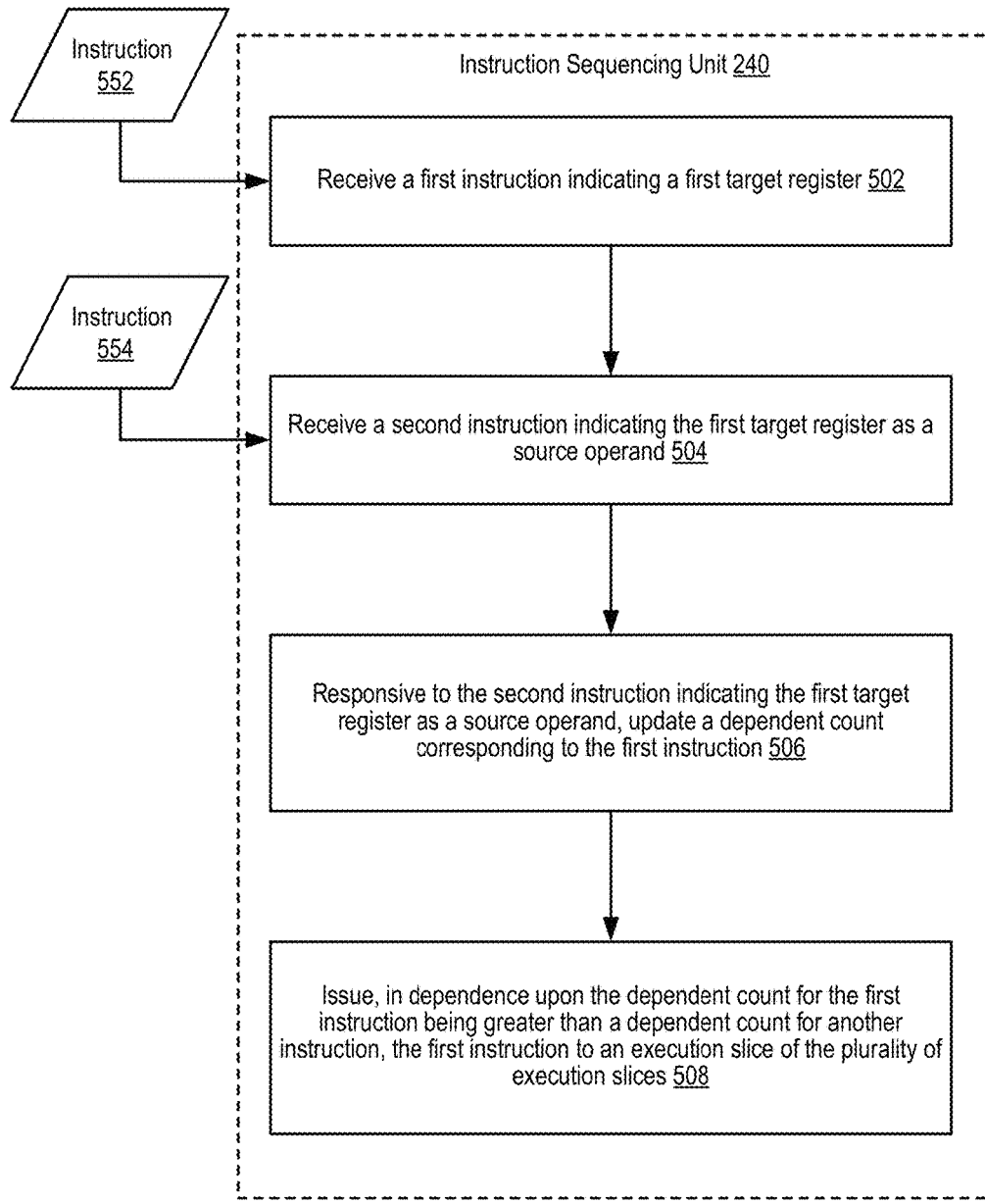
FIG. 5 sets forth a flow chart illustrating an exemplary method of operation of a multi-slice processor configured to implement dependency accumulation instruction sequencing according to different embodiments.

For further explanation, FIG. 5 sets forth a flow chart illustrating an exemplary method of implementing dependency accumulation instruction sequencing. In this example, instructions are received at an instruction sequencing unit (240) of an execution slice (204) of a multi-slice processor (156). The method of FIG. 5 may be carried out by a multi-slice processor similar to that in the examples of FIGS. 1-4. Such a multi-slice processor may include an instruction sequencing unit (240) that includes a dependent count table (306) and an issue queue (336), as described above with regard to FIGS. 3 and 4.

The method of FIG. 5 includes receiving (502) a first instruction (552) indicating a first target register. Receiving (502) the instruction (452) may be carried out by the instruction sequencing unit (240) receiving the instruction (552) from the dispatch network (202) along one of the data lines from the dispatch network (202) to an execution slice (204) depicted in FIG. 2. Determining the first target register may be carried out by decoding the instruction (552) to identify the instruction, operands for the instruction, and the target register. Further, respective instruction sequencing units (240) of the multiple execution slices may receive respective instructions from the dispatch network (202).

The method of FIG. 5 also includes receiving (504) a second instruction (554) indicating the first target register as a source operand. Receiving (504) the second instruction (554) may be carried out as described above with regard to receiving (502) the first instruction. Further, determining that the first target register is a source operand may be carried out by decoding the instruction (554) to identify the instruction, operands for the instruction, and a target register.

The method of FIG. 5 also includes, responsive to the second instruction indicating the first target register as a source operand, updating (506) a dependent count corresponding to the first instruction. Updating (506) a dependent count corresponding to the first instruction may be carried out as described above with regard to updating the dependent count (310) field of the dependent count table (306) and the dependent count (340) field of the issue queue (336).

For example, the dependency accumulation analysis unit (302) may index into the dependent count table (306) for each entry corresponding to a source operand register of the second instruction to identify a dependent count table entry for the first instruction, and then increment the dependent count (310) field for the first instruction. Further, in this example, using the queue position (312) value for the identified dependent count table entry in the dependent count table (306) for the first instruction, the dependent count (340) value of the issue queue (336)—at an issue queue entry indexed according to the queue position (312) value—may also be incremented or set to the dependent count (310) value in the dependent count table (306).

The method of FIG. 5 also includes issuing (508), in dependence upon the dependent count for the first instruction being greater than a dependent count for another instruction, the first instruction to an execution slice of the plurality of execution slices. Issuing (508) the first instruction may be carried out by the instruction sequencing unit (240) determining a set of instructions that are ready to issue—where an instruction may be considered ready when each dependency has been resolved.

Issuing (508) the first instruction may be further carried out by determining dependent count value for each of the ready instructions—where dependent count values are stored in a dependent count (340) field of each of the instructions in the issue queue (336)—and selecting, from among the set of ready instructions, the ready instruction with a greatest dependent count (340) value. In this example, the ready instruction with a greatest dependent count (340) value is the first instruction (552).

Issuing (508) the first instruction may be further carried out by the instruction sequencing unit (240) propagating the first instruction to an execution slice of the plurality of execution slices. In this way, from among a set of ready instructions to be issued, the instruction sequencing unit may issue an instruction that has a greater likelihood, as compared to instructions with lower dependent count values, of clearing out a greater number of subsequent instructions in the issue queue—which may result in allowing a greater number of dependent instructions to issue from the issue queue and release their respective issue queue entries.

Figure 6:
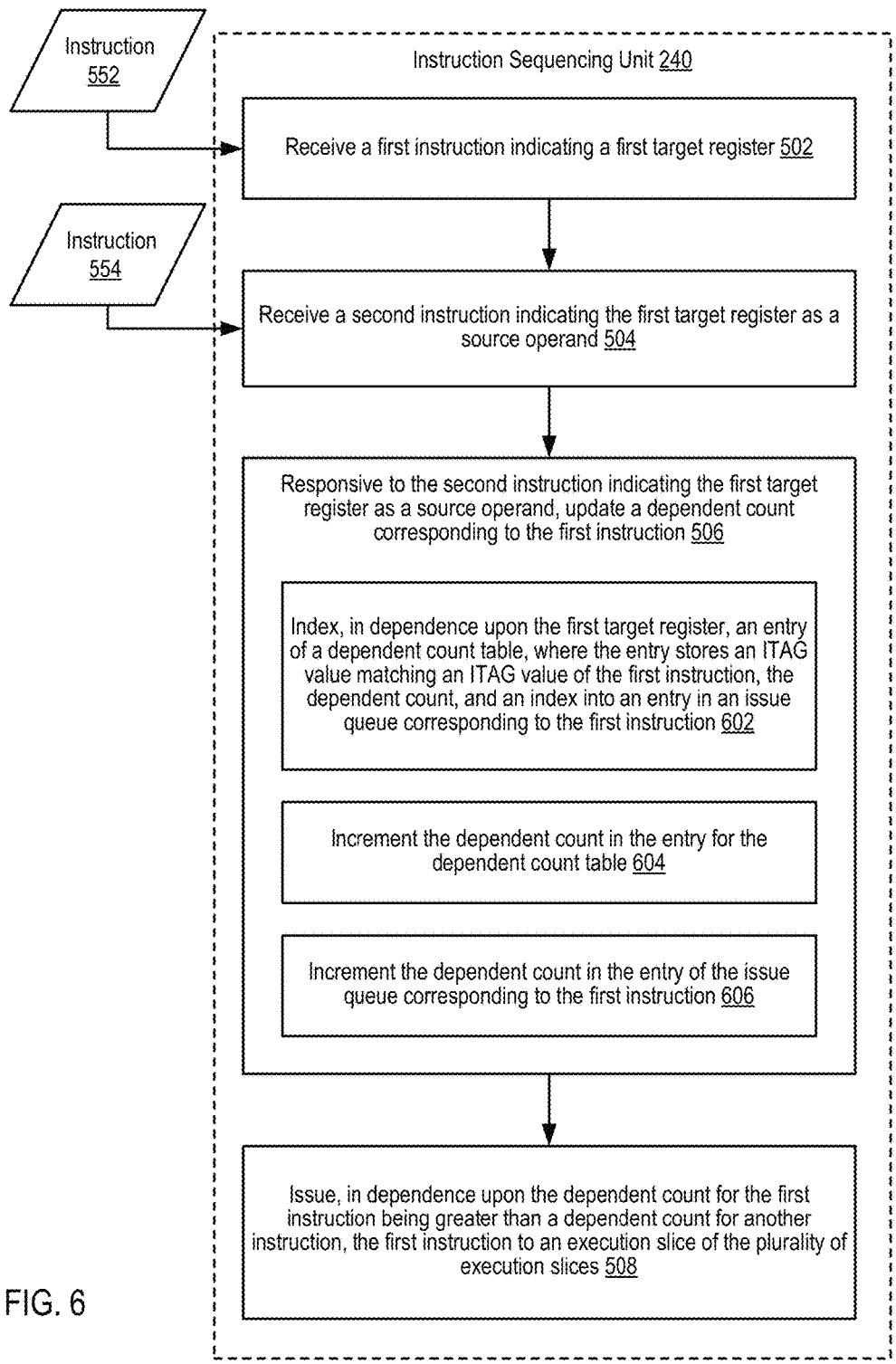
FIG. 6 sets forth a flow chart illustrating an exemplary method of operation of a multi-slice processor configured to implement dependency accumulation instruction sequencing according to different embodiments.

For further explanation, FIG. 6 sets forth a flow chart illustrating an exemplary method of implementing dependency accumulation instruction sequencing. In this example, instructions are received at an instruction sequencing unit (240) of an execution slice (204) of a multi-slice processor (156). The method of FIG. 6 may be carried out by a multi-slice processor similar to that in the examples of FIGS. 1-4. Such a multi-slice processor may include an instruction sequencing unit (240) that includes a dependent count table (306) and an issue queue (336), as described above with regard to FIGS. 3 and 4.

The method of FIG. 6 is similar to the method of FIG. 5 in that the method of FIG. 6 also includes: receiving (502) a first instruction (552) indicating a first target register; receiving (504) a second instruction (554) indicating the first target register as a source operand; responsive to the second instruction indicating the first target register as a source operand, updating (506) a dependent count corresponding to the first instruction; and issuing (508), in dependence upon the dependent count for the first instruction being greater than a dependent count for another instruction, the first instruction to an execution slice of the plurality of execution slices.

The method of FIG. 6 differs from the method of FIG. 5, however, in that the method of FIG. 6 further specifies updating (506) a dependent count corresponding to the first instruction to include: indexing (602), in dependence upon the first register, an entry of a dependent count table, where the entry stored an ITAG value matching an ITAG value of the first instruction, the dependent count, and an index into an entry in an issue queue corresponding to the first instruction; incrementing (604) the dependent count in the entry for the dependent count table; and incrementing (606) the dependent count in the entry of the issue queue corresponding to the first instruction.

Indexing (602) an entry of a dependent count table may be carried out by using the first target register—where the first target register is a source operand of the second instruction—and identifying an entry of the dependent count table (306) corresponding to the target register as described above with regard to updating dependent count table (306) responsive to receiving instructions (402, 404, 406). For example, the dependent count table (306) may have an entry for each logical register in a bank of registers usable by computer instructions, which, in the case that there are 32 logical registers, may correspond to entries 0-31. In other examples, different number of registers may be used. In this way, for a target register of, say, "R2," the dependent count table (306) may index entry number 2.

Incrementing (604) the dependent count in the entry for the dependent count table may be carried out by accessing the dependent count (310) field of the indexed entry, in this example, entry 2 corresponding to the first target register, and adding a constant value to the current value stored in the dependent count (310) field. In some examples, the constant value may be one (1), and in other examples, the constant value may be a number mapped to a particular instruction type. For example, a configuration file, or default values, may map each of a plurality of instruction types with corresponding increment values, where larger increment value may correspond to higher priorities assigned to a particular instruction type. In this way, a higher increment value may cause an instruction to more quickly have a higher dependent count, which would make the instruction more likely to be issued based on the dependent count logic that selects which entry to issue among the ready instructions.

Incrementing (606) the dependent count in the entry of the issue queue corresponding to the first instruction may be carried out by using the queue position (312) value of the entry indexed at (602), indexing into the issue queue (336) using the queue position (312) value, and incrementing the dependent count (340) field in accordance with the incremented value of the dependent count (310) field.

In this way, dependent count values stored in the dependent count table (306) and the issue queue (336) may reflect current dependencies among instructions received at the instruction sequencing unit (240).

Figure 7:
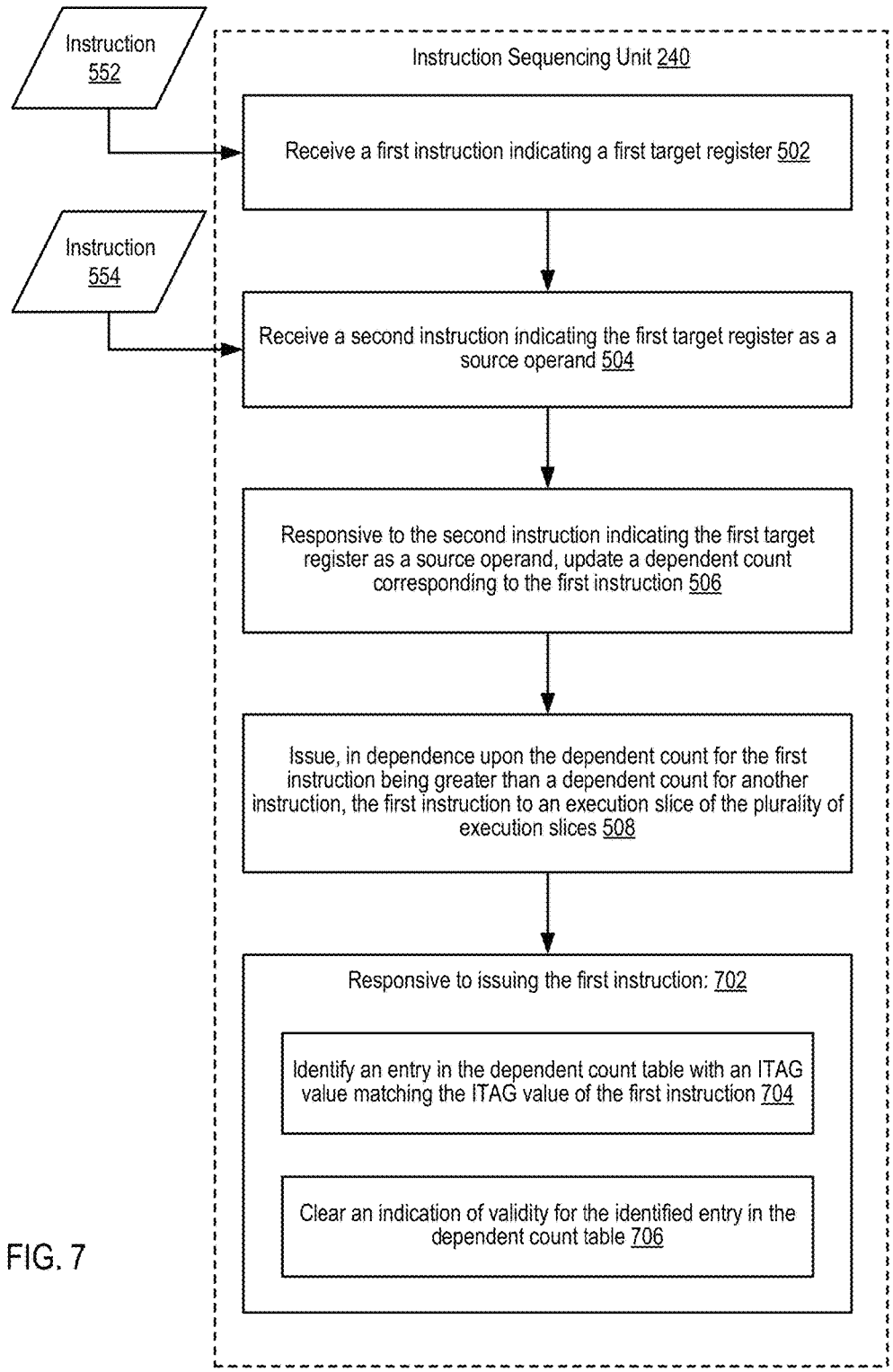
FIG. 7 sets forth a flow chart illustrating an exemplary method of operation of a multi-slice processor configured to implement dependency accumulation instruction sequencing according to different embodiments.

For further explanation, FIG. 7 sets forth a flow chart illustrating an exemplary method of implementing dependency accumulation instruction sequencing. In this example, instructions are received at an instruction sequencing unit (240) of an execution slice (204) of a multi-slice processor (156). The method of FIG. 7 may be carried out by a multi-slice processor similar to that in the examples of FIGS. 1-4. Such a multi-slice processor may include an instruction sequencing unit (240) that includes a dependent count table (306) and an issue queue (336), as described above with regard to FIGS. 3 and 4.

The method of FIG. 7 is similar to the method of FIG. 5 in that the method of FIG. 7 also includes: receiving (502) a first instruction (552) indicating a first target register; receiving (504) a second instruction (554) indicating the first target register as a source operand; responsive to the second instruction indicating the first target register as a source operand, updating (506) a dependent count corresponding to the first instruction; and issuing (508), in dependence upon the dependent count for the first instruction being greater than a dependent count for another instruction, the first instruction to an execution slice of the plurality of execution slices.

The method of FIG. 7 differs from the method of FIG. 5, however, in that the method of FIG. 7 further includes responsive (702) to issuing (508) the first instruction: identifying (704) an entry in the dependent count table with an ITAG value matching the ITAG value of the first instruction; and clearing (706) an indication of validity for the identified entry in the dependent count table.

Identifying (704) the entry in the dependent count table with the ITAG value matching the ITAG value of the first instruction may be carried out by the instruction sequencing unit (240) using the issue update (354) logic to compare an ITAG value for the issued instruction, depicted as issued ITAG (366) input in FIG. 3, and each of the ITAG values stored in the dependent count table (306), depicted as dependent count table ITAGs (370) in FIG. 3. The issue update (354) logic may then identify an entry for a matching ITAG value.

Alternatively, in another example, identifying (704) the entry in the dependent count table with the ITAG value matching the ITAG value of the first instruction may be carried out by using the target register value stored in the issue queue entry, and using the target register value as an index into the dependent count table (306). Further, the indexed entry in the dependent count table (306) may be read to identify a single ITAG value which may be compared to the ITAG value for the issued instruction. In this example, an ITAG value compare is performed in case that the entry in the dependent count table (306) has been replaced by another instruction writing the same logical register.

Clearing (706) the indication of validity for the identified entry in the dependent count table (306) may be carried out by setting a valid (314) field value to a NULL value, or to some other value indicating invalidity. Similarly, responsive to issuance, the issue queue (336) may be updated by setting a valid (344) value to a NULL value, or to some other value indicating invalidity.

In this way, the dependent count table (306) and the issue queue (336) may be maintained to reflect currently valid instructions, which may prevent subsequent instructions from indicating a dependence upon instructions that have been issued.

Figure 8:
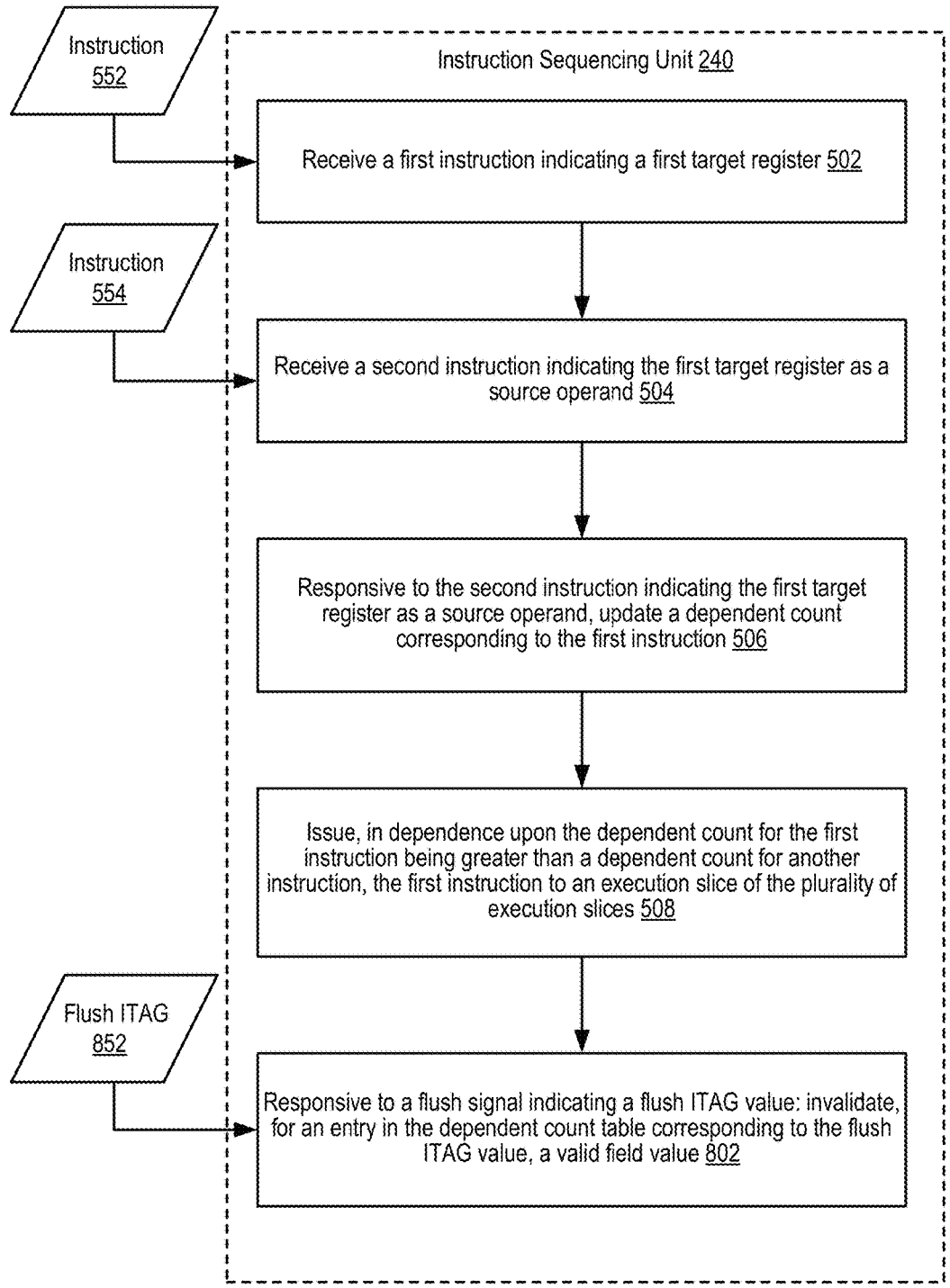
FIG. 8 sets forth a flow chart illustrating an exemplary method of operation of a multi-slice processor configured to implement dependency accumulation instruction sequencing according to different embodiments.

For further explanation, FIG. 8 sets forth a flow chart illustrating an exemplary method of implementing dependency accumulation instruction sequencing. In this example, instructions are received at an instruction sequencing unit (240) of an execution slice (204) of a multi-slice processor (156). The method of FIG. 8 may be carried out by a multi-slice processor similar to that in the examples of FIGS. 1-4. Such a multi-slice processor may include an instruction sequencing unit (240) that includes a dependent count table (306) and an issue queue (336), as described above with regard to FIGS. 3 and 4.

The method of FIG. 8 is similar to the method of FIG. 5 in that the method of FIG. 8 also includes: receiving (502) a first instruction (552) indicating a first target register; receiving (504) a second instruction (554) indicating the first target register as a source operand; responsive to the second instruction indicating the first target register as a source operand, updating (506) a dependent count corresponding to the first instruction; and issuing (508), in dependence upon the dependent count for the first instruction being greater than a dependent count for another instruction, the first instruction to an execution slice of the plurality of execution slices.

The method of FIG. 8 differs from the method of FIG. 5, however, in that the method of FIG. 8 further includes responsive to a flush signal indicating a flush ITAG value (852): invalidate (802), for an entry in the dependent count table corresponding to the flush ITAG value, a valid field value.

Decrementing (802) the dependent count value for an entry corresponding to the flush ITAG value (852) may be carried out by the instruction sequencing unit (240) using the flush update (356) logic to compare an ITAG value for a flushed instruction, depicted as flushed ITAG (368) input in FIG. 3, and each of the ITAG values stored in the dependent count table (306), depicted as dependent count table ITAGs (370) in FIG. 3. The flush update (356) logic may then identify an entry for a matching ITAG value that corresponds to the flush ITAG value, and the valid (314) value for the entry may be invalidated.

Decrementing the dependent count (310) value may be carried out by the instruction sequencing unit (240) subtracting from the currently stored dependent count (310) value a quantity corresponding to an amount by which the dependent count (310) was incremented for the flushed instruction. Similarly, the issue queue (336) may be updated with a new dependent count (340) value, where the entry updated may be indexed according to the queue position (312) value for the identified entry of the dependent count table (306). In this way, the dependent count table (306) and the issue queue (336) may be maintained to reflect a dependent count that corresponds with instructions that have not been flushed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices, wherein the method comprises:

receiving a first instruction indicating a first target register;

receiving a second instruction indicating the first target register as a source operand;

responsive to the second instruction indicating the first target register as a source operand, updating a dependent count corresponding to the first instruction including incrementing the dependent count by an increment value that corresponds to one of a plurality of different instruction types for the second instruction, wherein each different instruction type corresponds to a different increment value; and issuing, in dependence upon the dependent count for the first instruction being greater than a dependent count for another instruction and satisfying a dependent count threshold value, and in dependence upon the age of the first instruction being the same or greater than another instruction with an equal dependent count, and further in dependence upon the first instruction being a ready instruction among a plurality of ready instructions, the first instruction to an execution slice of the plurality of execution slices.

2. The method of claim 1, wherein the threshold value is user-configurable, and wherein for each instruction type of a plurality of instruction types there is a respective threshold value.

3. The method of claim 1, wherein updating the dependent count corresponding to the first instruction comprises:
indexing, in dependence upon the first target register, an entry of a dependent count table, wherein the entry stores an instruction tag (ITAG) value matching an ITAG value of the first instruction, the dependent count, and an index into an entry in an issue queue corresponding to the first instruction;
incrementing the dependent count in the entry for the dependent count table; and
incrementing the dependent count in the entry of the issue queue corresponding to the first instruction.

4. The method of claim 3, further comprising:
responsive to issuing the first instruction:
identifying an entry in the dependent count table with an ITAG value matching the ITAG value of the first instruction; and
clearing an indication of validity for the identified entry in the dependent count table.

5. The method of claim 3, further comprising:
responsive to a flush signal indicating a flush ITAG value:
invalidating, for an entry in the dependent count table corresponding to the flush ITAG value, a valid field value.

6. The method of claim 1, wherein the instruction sequencing unit alternates between selecting a queued, ready instruction in dependence on instruction age and selecting a queued, ready instruction in dependence on a number of dependent instructions that depend on a particular instruction.

7. A multi-slice processor comprising:
a plurality of execution slices, wherein the multi-slice processor is configured to carry out:
receiving a first instruction indicating a first target register;
receiving a second instruction indicating the first target register as a source operand;
responsive to the second instruction indicating the first target register as a source operand, updating a dependent count corresponding to the first instruction including incrementing the dependent count by an increment value that corresponds to one of a plurality of different instruction types for the second instruction, wherein each different instruction type corresponds to a different increment value; and
issuing, in dependence upon the dependent count for the first instruction being greater than a dependent count for another instruction and satisfying a dependent count threshold value, and in dependence upon the age of the first instruction being the same or greater than another instruction with an equal dependent count, and further in dependence upon the first instruction being a ready instruction among a plurality of ready instructions, the first instruction to an execution slice of the plurality of execution slices.

8. The multi-slice processor of claim 7, wherein the threshold value is user-configurable, and wherein for each instruction type of a plurality of instruction types there is a respective threshold value.

9. The multi-slice processor of claim 7, wherein updating the dependent count corresponding to the first instruction comprises:
indexing, in dependence upon the first target register, an entry of a dependent count table, wherein the entry stores an instruction tag (ITAG) value matching an ITAG value of the first instruction, the dependent count, and an index into an entry in an issue queue corresponding to the first instruction;
incrementing the dependent count in the entry for the dependent count table; and
incrementing the dependent count in the entry of the issue queue corresponding to the first instruction.

10. The multi-slice processor of claim 9, wherein the multi-slice processor is further configured to carry out:
responsive to issuing the first instruction:
identifying an entry in the dependent count table with an ITAG value matching the ITAG value of the first instruction; and
clearing an indication of validity for the identified entry in the dependent count table.

11. The multi-slice processor of claim 9, wherein the multi-slice processor is further configured to carry out:
responsive to a flush signal indicating a flush ITAG value:
invalidating, for an entry in the dependent count table corresponding to the flush ITAG value, a valid field value.

12. The multi-slice processor of claim 9, wherein the multi-slice processor further comprises an instruction sequencing unit configured to alternate between selecting a queued, ready instruction in dependence on instruction age and selecting a queued, ready instruction in dependence on a number of dependent instructions that depend on a particular instruction.

13. An apparatus comprising:
a plurality of execution slices and an instruction sequencing unit, wherein a multi-slice processor is configured to carry out:
receiving a first instruction indicating a first target register;
receiving a second instruction indicating the first target register as a source operand;
responsive to the second instruction indicating the first target register as a source operand, updating a dependent count corresponding to the first instruction including incrementing the dependent count by an increment value that corresponds to a one of a plurality of different instruction types for the second instruction, wherein each different instruction type corresponds to a different increment value; and
issuing, in dependence upon the dependent count for the first instruction being greater than a dependent count for another instruction and satisfying a dependent count threshold value, and in dependence upon the age of the first instruction being the same or greater than another instruction with an equal dependent count, and further in dependence upon the first instruction being a ready instruction among a plurality of ready instructions, the first instruction to an execution slice of the plurality of execution slices.

14. The apparatus of claim 13, wherein the threshold value is user-configurable, and wherein for each instruction type of a plurality of instruction types there is a respective threshold value.

15. The apparatus of claim 14, wherein updating the dependent count corresponding to the first instruction comprises:
   indexing, in dependence upon the first target register, an entry of a dependent count table, wherein the entry stores an instruction tag (ITAG) value matching an ITAG value of the first instruction, the dependent count, and an index into an entry in an issue queue corresponding to the first instruction;
   incrementing the dependent count in the entry for the dependent count table; and
   incrementing the dependent count in the entry of the issue queue corresponding to the first instruction.

16. The apparatus of claim 15, wherein the multi-slice processor is further configured to carry out:
   responsive to issuing the first instruction:
      identifying an entry in the dependent count table with an ITAG value matching the ITAG value of the first instruction; and
      clearing an indication of validity for the identified entry in the dependent count table.

17. The apparatus of claim 13, wherein the instruction sequencing unit alternates between selecting a queued, ready instruction in dependence on instruction age and selecting a queued, ready instruction in dependence on a number of dependent instructions that depend on a particular instruction.

* * * * *